3,674,437
CARBON BLACK PELLET MIXER WITH SECTIONAL HELICAL-PIN MIXER
Oliver K. Austin, Bartlesville, Okla., and Bruno F. Loewen, Salvador, Brazil, assignors to Phillips Petroleum Company
Filed July 14, 1970, Ser. No. 54,696
Int. Cl. C01b *31/14;* C09c *1/58*
U.S. Cl. 23—252 R    4 Claims

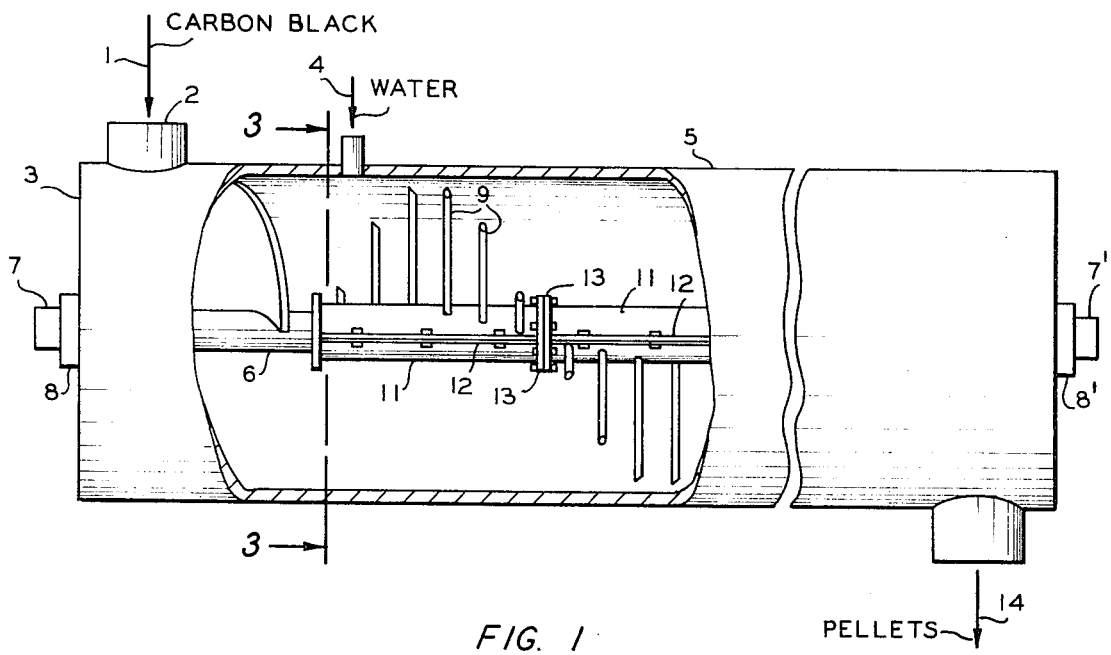
FIG. 1
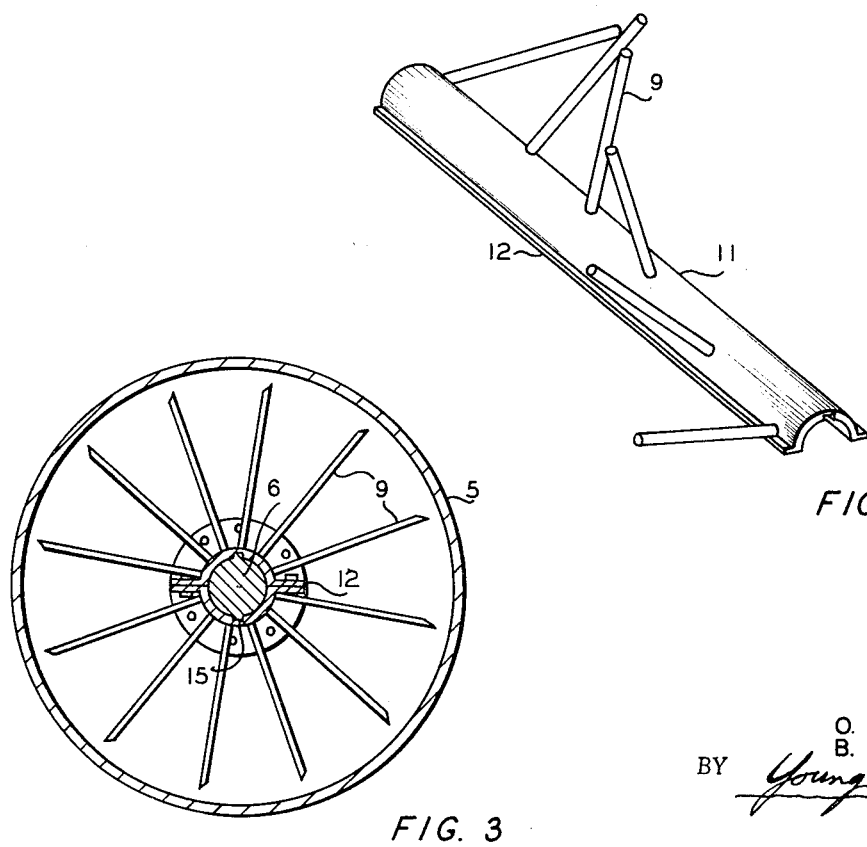
FIG. 2
FIG. 3
INVENTORS
O. K. AUSTIN,
B. F. LOEWEN
BY Young & Quigg
ATTORNEYS · # United States Patent Office 3,674,437
Patented July 4, 1972

ABSTRACT OF THE DISCLOSURE

Agitating pins of a carbon black pellet mixer are affixed in a helical pattern on longitudinally divided sectional holders, two sections of which holders forming at least one half of a complete helix when installed in opposition to each other onto and around the drive shaft of the pellet mixer. Such sectional holders are quickly replaceable so as to minimize mixer downtime due to pin wear and necessary replacement.

This invention relates to an improved carbon black mixer. In another aspect it relates to sectional pin-bearing unit for carbon black pelletizer mixer shafts.

BACKGROUND OF THE INVENTION

Carbon black can be agglomerated or pelletized into relatively non-dusting products of increased apparent density by means of agitating the black either in the dry form, or more usually by agitating the black while wetting with a liquid such as water or light hydrocarbon. The pellets so produced are in the form of relatively dense free-flowing beads which have the advantages of increased bulk density and cleanliness in handling.

The necessary agitation and pelletizing action are obtained by the rotation of an axially positioned shaft within an elongated normally stationary chamber of a horizontal drum. To the shaft are affixed a series of extrorsely projecting spaced-apart pins arranged in a helix-form. Looking across the shaft endwise, the pins have the appearance of the multiple spokes of a wheel, though the spokes do not quite touch the rim or drum. Viewing the shaft lengthwise, the tips of the series of spokes on the shaft have an appearance akin to a sine wave.

A major difficulty as well as expense of the pelletizing operation is the considerable degree of abrasion and wear of the ends of the pins. Thus, the pins tend to wear rapidly at their outer extremities, resulting in decreased pin-length and non-uniformity of product, as well as increase in the thickness of the carbon black liner which usually builds up in such mixers. The latter effect results in a tendency for the lining to fall off or become dislodged unevenly and in chunks, which interfere in the operation of the pelletizer, uniformity of the end-product, and the like.

The pins do not wear evenly, but, instead, wear with gross unevenness. Pins in the forward portion of the mixer, i.e., at and toward the inlet for the carbon black, tend to wear with much greater rapidity than do pins further along the shaft and toward the outlet for the pellets. For example, the forward pins may last less than one month, while pins toward the outlet may last 6 to 12 months and longer.

Heretofore, shut-down has required replacement of the entire shaft with pins, a long and expensive process. Alternatively, individual pins have been replaced, where means of insertion or connection make this possible, but this also is most time-consuming.

Furthermore, in carbon black plants in many parts of the country and world, the length of the shaft varies considerably, depending upon the type of carbon black produced and to be pelletized, and the size, type and density of pellets desired for various purposes or shipping requirements. The net result has been a necessity to stock an undue number of pins, and to stock shafts of varying lengths. And, this still does not solve the necessity of replacing what is worn quickly and efficiently and getting the mixer back on line in as short a time as possible.

BRIEF SUMMARY OF THE INVENTION

Our invention solves these difficulties neatly and effectively. We have invented pin-holders which are longitudinally-divided pin-bearing sections. These holders are quickly removable and quickly replaceable in such number of sections as may be necessary to restore the operating efficiency of the mixer. The removed sections then can be revamped by replacing or realigning such pins as may be necessary at the convenience of the operating group.

Our invention provides sectioned-holders which can be easily and quickly replaced along the mixer drive shaft, and provides a method of stocking a unit part so that any section can be replaced as necessary, and the pin-containing portion of the mixer can be of a length as desired by simply adding as many sections lengthwise along the drive shaft as is desired or required by a particular mixer.

It is an object of our invention to provide pin-bearing longitudinally-split sections for carbon black pelleting apparatus.

It is a further object of our invention to provide replaceable agitator sections for carbon black pelleting apparatus shafts.

Another object of our invention is to reduce parts inventories for carbon black pelleting apparatus.

Other aspects, objects, and the several advantages of our invention will be apparent to one skilled in the art to which our invention most nearly appertains from a perusal of the following description and from our appended claims.

SHORT DESCRIPTION OF THE DRAWING

Referring to the drawing accompanying this specification, two figures are shown.

FIG. 1 shows an overall general view of a carbon black pelletizing apparatus with one side partly broken away to show our sectional shaft and the helical placement of the agitator pins.

FIG. 2 is a perspective view of one of our pin-bearing sections or holders to illustrate pin placement thereon, FIG. 3 is an end view cross-sectional across the shaft at 3—3 of FIG. 1 to show the sectional nature of the replaceable sections of our invention and the spokes or pins placed thereupon.

DETAILED DESCRIPTION OF THE DRAWING AND INVENTION

Referring, now, to FIG. 1 in particular, carbon black 1 is charged to the feed inlet 2 of the pellet mixer 3. The carbon black 1 usually is charged at a continuous and measured rate, and more usually via a surge tank (not shown) so as to control or balance the amount of carbon black received from producing facilities with that passing through the mixer 3. The actual pelletizing process and pelleting apparatus are both well-known in the art, and hence do not here require detailed description. In order to carry out a wet pelleting operation, one or more moistening agents, such as water 4, a dilute molasses solution, or a light hydrocarbon such as kerosene, is introduced into the mixing or pelletizing chamber by means of inlet 4.

The amount of such wetting agent to be introduced usually ranges between about 25 and 65 weight percent relative to the finished pelleted product. The exact amount of wetting agent depends upon the type of material subjected to pelleting, and, of course, on the wetting agent itself.

Mixer 3 consists of a generally cylindrical outer drum 5 typically with an inside diameter of the order or from 20 inches to about 24 inches, and a rather variable length from a few feet to as much as 15 feet. The agitating element within drum 5 of mixer 3 comprises a rotatable shaft 6 driven by a rotating method or mechanism (not shown) such as a motor, and mounted concentrically within the drum 5. Shaft 6 rotates around its longitudinal axis on a substantially horizontal plane. Shaft 6 can be any convenient diameter depending on its length and the mechanical strength required, usually from about 2 to 6 inches in diameter. The terminal portions 7 and 7' of rotatable shaft 6 usually are supported by bearings 8 and 8' at each end. At least one end, 7 or 7', of shaft 6 extends through its corresponding bearing 8 or 8' for connection with an appropriate drive.

Within the housing or drum 5, substantially the entire length of the rotatable shaft 6, at least that portion downstream from inlet 2 for carbon black 1, is provided with a plurality of radially projecting extrorsely protruding agitator pins 9. These pins 9 are rigidly mounted on our replaceable sectional pin-holders 11, and are placed at uniformly spaced distances, both longitudinally along and angularly around our holders, so that a series of pinholders form one or more flights or helical rows of pins along the working length of mixer 3. The diameter of pins 9 usually varies from about ⅜ to ¾ inch. The pins 9 can be spaced apart, longitudinally along the holder 11 and hence along the shaft 6 for from about 2 to 12 inches. Desirably, pins 9 are constructed of a hardened steel, and preferably of a hardened stainless steel for maximum life.

The pins 9 are of such a length as to provide a clearance of from about ½ inch to 3 inches or more between the inner surface of drum 5 and the respective outer tips of pins 9. In carbon black pelletizers, the formation of beads or pellets does not occur unless the effective space between the outer tips of pins 9 and the inner surface of chamber 5 is reduced to less than about ½ of an inch. This degree of clearance usually is developed in actual operation of the mixer 3 through a buildup of a layer of carbon black mixture which clings tenaciously to the inner surface of mixing chamber 5. However, some mixers operate with less than ½ inch clearance between outer tips of pins 9 and inner surface of chamber 5, do not develop a liner, and hence it is particularly important in such close-tolerance mixers to maintain proper pin length.

Each sectional holder 11 preferably is equipped with attaching or connecting devices, such as flanges 12 as illustrated, for use in attaching two holders to each other in opposing pair fashion around drive shaft 6, and also similar end-connecting devices on at least one end 13 of each holder so that at least two pairs of holders can be attached in abutting fashion in sequence along shaft 6. The attaching method can be flanges 12 and 13 on each holder as illustrated, or toggle-catch, or other convenient device. With flanges 12 and 13, for example, several sections 11 can be securely connected, such as by bolting, to each other and about drive shaft 6. As many sets as required can be attached end to end according to the particular length of the holders and the relative overall length of the mixer chamber 5 and shaft 6 involved, the number of flights of pins desired, and the like, near the downstream extremity of the pelletizer 3 is shown the product discharge chute 14 from drum 5 for the finished pellets.

FIG. 2 illustrates by perspective the placement of pins 9 along a holder 11. Each holder 11 has the appearance of an open-ended trough with lip or flange 12. Illustrated is one holder with a half-flight or half-helix of pins 9. In use it can be opposed, if desired, by a blank holder, i.e., one without pins. The next set can be identical except turned 180 degrees. Two such pairs then form a complete helix. Another convenient construction is for a pair of opposingly-placed sections to form, together, one complete helix. One section has a half-flight placed along half its length. The corresponding section then forms the lower half and completes a helix. Each holder 11 usually bears at least half of a complete round or circle of pins 9. Or, each section can contain two half-helices, and two successively placed pairs of holders then complete one full helix, the end-half of another, and the beginning half of still another. Of course, each section is identical, and reference to top or lower is for convenience only. The choice depends on the overall length of section chosen, and the pelletizing requirements for number of pins, relative closeness of spacing of pins, and the like. A pin-bearing section can be opposed, if desired, or where suitable at one end or other of the mixer, by a blank section, i.e., one sans pins.

FIG. 3 of our drawing shows a cross section at 3—3 across drive shaft 6 of FIG. 1, and illustrates an end-view of our sectional units 11 attached in opposition to each other by means of flanges 12 around drive shaft 6. It is preferable that the sections 11 be keyed 15 to drive shaft 6 so as to avoid possibility of slippage around drive shaft 6 when the mixing apparatus is in operation within stationary drum 5. Each section 6 can contain a key slot, and the drive shaft have a protruding key along one side. Alternatively, the sections 6 can have a protruding key, and the drive shaft a recessed cut longitudinally along each side to receive the respective keys.

It can be readily understood from the description of the apparatus, as given particularly relative to the figures in our drawing, that our pin-bearing sections can be relatively quickly and easily removed and replaced with new or revamped sections, as time and pin wear require. The removed worn pin-bearing sections then can be revamped, with new pins, or replacement pins, or extended pins, as may be required to place the sections again in useful condition for future use.

Reasonable variations and modifications of our invention are possible while still within the scope of our disclosure, and without departing from the intended scope and spirit thereof, as detailed in our specification, drawing, and the claims appended.

We claim:

1. In a carbon black pellet mixer comprising an elongated generally horizontal at least substantially cylindrical mixing drum, inlet means to said mixing drum for the introduction of carbon black, exit means on said mixing drum for withdrawal therefrom of the resulting carbon black pellets, a shaft positioned along the longitudinal axis of said mixing drum and rotatable about said axis, means for rotating said shaft around said longitudinal axis, and pellet-forming spaced apart extrorsely protruding pins positioned about said shaft; the improvement which comprises a plurality of pin supporting holders positioned on said shaft coaxially therewith and rotatable by said shaft, each said pin supporting holder being in axially abutting relationship with at least one other of said pin supporting holders, each said pin supporting holder being longitudinally divided into a pair of opposingly placed trough-shaped sections having longitudinally extending flanges, the interior surfaces of each pair of opposing sections defining a generally tubular shaped cavity corresponding to said shaft and adapted to contain said shaft therein, means for releasably attaching together the longitudinal flanges of each pair of sections, each pin supporting holder being provided with a circumferential flange on at least one end thereof which is adjacent a corresponding circumferential flange on an abutting pin supporting holder, means for releasably attaching together the circumferential flanges of abutting pin supporting holders, at least one section of each pin supporting holder having affixed thereto a plurality of said spaced apart extrorsely proturding pins, said pins being spaced apart both longitudinally along the respective section and angularly about the exterior dimension of said respective section to form at least one half of a helix, with the pins on each abutting pair of pin supporting holders being positioned to form at least a full helix.

2. An improved carbon black pellet mixer in accordance with claim 1 wherein each pin supporting holder is provided with circumferential flanges at each end thereof.

3. An improved carbon black pellet mixer in accordance with claim 1 wherein both sections of each pin supporting holder have a plurality of said pins affixed thereto.

4. An improved carbon black pellet mixer in accordance with claim 1 wherein each pin supporting holder is secured to said shaft by a key.

References Cited
UNITED STATES PATENTS

| | | | |
|---|---|---|---|
| 922,724 | 10/1907 | Schuffler | 259—178 |
| 1,344,306 | 2/1919 | Mattison Jr. | 259—178 |
| 3,326,642 | 6/1967 | Ruble | 23—314 |
| 3,528,785 | 9/1970 | Dingus | 23—314 |

NORMAN YUDKOFF, Primary Examiner

S. SILVERBERG, Assistant Examiner

U.S. Cl. X.R.

23—314; 259—109